United States Patent
Miyahara et al.

(10) Patent No.: US 9,507,475 B2
(45) Date of Patent: Nov. 29, 2016

(54) TOUCH PANEL DEVICE WITH SECOND TOUCH DETECTOR

(71) Applicant: MITSUBISHI ELECTRIC CORPORATION, Tokyo (JP)

(72) Inventors: Kageyasu Miyahara, Tokyo (JP); Seiichiro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/643,184

(22) Filed: Mar. 10, 2015

(65) Prior Publication Data

US 2015/0268764 A1    Sep. 24, 2015

(30) Foreign Application Priority Data

Mar. 19, 2014    (JP) .................................. 2014-056391

(51) Int. Cl.
*G06F 3/044*        (2006.01)
*G06F 3/041*        (2006.01)

(52) U.S. Cl.
CPC ............. *G06F 3/044* (2013.01); *G06F 3/0416* (2013.01)

(58) Field of Classification Search
CPC .............................. G06F 3/0416; G06F 3/044
See application file for complete search history.

(56) References Cited

U.S. PATENT DOCUMENTS

| 8,773,146 B1* | 7/2014 | Hills ...................... G01N 27/22 324/658 |
| 2012/0283972 A1* | 11/2012 | Vandermeijden ..... G06F 3/0416 702/65 |

FOREIGN PATENT DOCUMENTS

| JP | 2007-208682 A | 8/2007 |
| JP | 2008-134836 A | 6/2008 |
| JP | 2012-150747 A | 8/2012 |

* cited by examiner

*Primary Examiner* — Andrew Sasinowski
*Assistant Examiner* — Chun-Nan Lin
(74) *Attorney, Agent, or Firm* — Studebaker & Brackett PC

(57) ABSTRACT

A touch panel device includes a controller controlling the coordinate detection circuit, the coordinate detection circuit comprising: a first baseline value manager, which generates first baseline values and performs updating according to a rule, a first touch detector, which performs touch detection based on the measurement values and the first baseline values, a second baseline value manager that generates second baseline values and performs updating according to a different rule, and a second touch detector, which performs touch detection based on the measurement values and the second baseline values, and the controller outputs a detection result of the first touch detector, and in a case where the second touch detector detects a touch, after the touch disappears, the controller controls the first baseline value manager to regenerate the first baseline value.

5 Claims, 7 Drawing Sheets

TOUCH PANEL DEVICE WITH SECOND TOUCH DETECTOR

CROSS-REFERENCE TO RELATED APPLICATION

This application claims priority from Japanese Patent Application No. 2014-056391 filed on Mar. 19, 2014, the entire subject matter of which is incorporated herein by reference.

TECHNICAL FIELD

This disclosure relates to a touch panel device and is suitably used in an information processing apparatus having a touch input function using a touch panel.

BACKGROUND

A touch panel device detects a touch of an instructing body such as a finger and specifies the coordinates of the touched point, and it is considered as excellent user interface unit which can be attached to display devices so as to substitute for mechanical keyboards and mouse of an information processing apparatus, and various coordinate detection types such as resistive film types and electrostatic capacitance types have been manufactured.

In coordinate detection types, a projected capacitive touchscreen type (hereinafter, referred to as PCT type) capable of detecting a touch of an instructing body even in a case where the front surface side of a touch panel including a touch sensor is covered by a protective plate, such as a glass plate, with several mm thickness. Since it is possible to dispose the protective plate on the front surface, the PCT type is excellent in toughness. Also, since there is no operating unit, the PCT type has advantages in long life. Since these advantages have been recognized, PCT type touch panels are attached on image display devices so as to be used as various touch input units for mobile communication devices, ATMs of financial institutions, car navigation devices, and so on (Japanese Patent Application Laid-Open No. 2008-134836).

Meanwhile, in the projected capacitive type, since a capacitance value (measurement values) is depending on variations in temperature, environmental changes (including rain or snow which falls in the open air), and so on, it is difficult to use an absolute threshold value to detect a touch on a touch sensor panel. For this reason, there is a method in which measurement values are measured as reference values (baseline values) in a state where there is no touch of a finger or the like, and a touch is detected based on amounts of changes from the baseline values (differences between measurement values and the baseline values), and there is a method in which if it is determined that there is no touch, baseline values are automatically updated so as to keep up with variations in surrounding environment such as temperature (for example, Japanese Patent Application Laid-Open No. 2007-208682). If the baseline values have deviations (if the difference between the baseline value and the measurement value obtained when there was no touch are large), it becomes impossible to correctly detect a touch. For this reason, it is important to correct the deviations of the baseline values. There is a method in which, in order to automatically correct baseline values in a case where the baseline values have large deviations due to a sudden change in environment or the like, if the baseline values are considered as being abnormal, the baseline values are updated (for example, Japanese Patent Application Laid-Open No. 2012-150747).

SUMMARY

Since the touch panel device according to the background art are configured as described above, according to deviations of the baseline value, correction (baseline value regeneration) may require a long time. For example, in a case where a small number of sensors corresponding to the area of the tip of a finger changes, since a touch panel device becomes the same state as a case where there is a touch of a finger, it is impossible in a short time to determine that state as an abnormality. Therefore, a state where it is impossible to detect any touch continues for a long time.

In contrast, in a case where a short time is set to determine an abnormal state, even a case where the touch panel device is being touched by a finger may be determined as an abnormality. In this case, since baseline value regeneration may be performed, it causes deviations from normal baseline values.

This disclosure is to surely perform returning to normal baseline values in a short time, regardless of deviations of baseline values.

A touch panel device according to this disclosure includes: a touch sensor panel that includes a plurality of sensors; a coordinate detection circuit that is connected to the touch sensor panel and detects touch coordinates when an instructing body touches the touch sensor panel; and a control unit that controls the coordinate detection circuit. The coordinate detection circuit comprises: a sensing unit, which performs capacitance measurement on respective sensors of the touch sensor panel, a first baseline value managing unit, which generates first baseline values as references for touch detection based on measurement values output from the sensing unit and stores the first baseline values and which performs updating according to a predetermined rule, a first touch detection unit, which performs touch detection based on the measurement values and the first baseline values, a second baseline value management unit which generates second baseline values as references for touch detection based on the measurement values and stores the second baseline values and which performs updating according to rule different from the predetermined rule of the first baseline value management unit, and a second touch detection unit, which performs touch detection based on the measurement values and the second baseline values, and wherein the control unit outputs a detection result of the first touch detection unit as an operation input to the outside, and wherein in a case where the second touch detection unit detects a touch, after the touch is disappeared, the control unit controls the first baseline value management unit to regenerate the first baseline value.

According to this disclosure, the control unit outputs the detection result of the first touch detection unit as an operation input to the outside, and if the second touch detection unit detects a touch, after the touch is disappeared, the control unit controls the first baseline storing-and-updating unit such to regenerate the baseline value. Therefore, it is possible to surely correct deviations of baseline values in a short time.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 1:
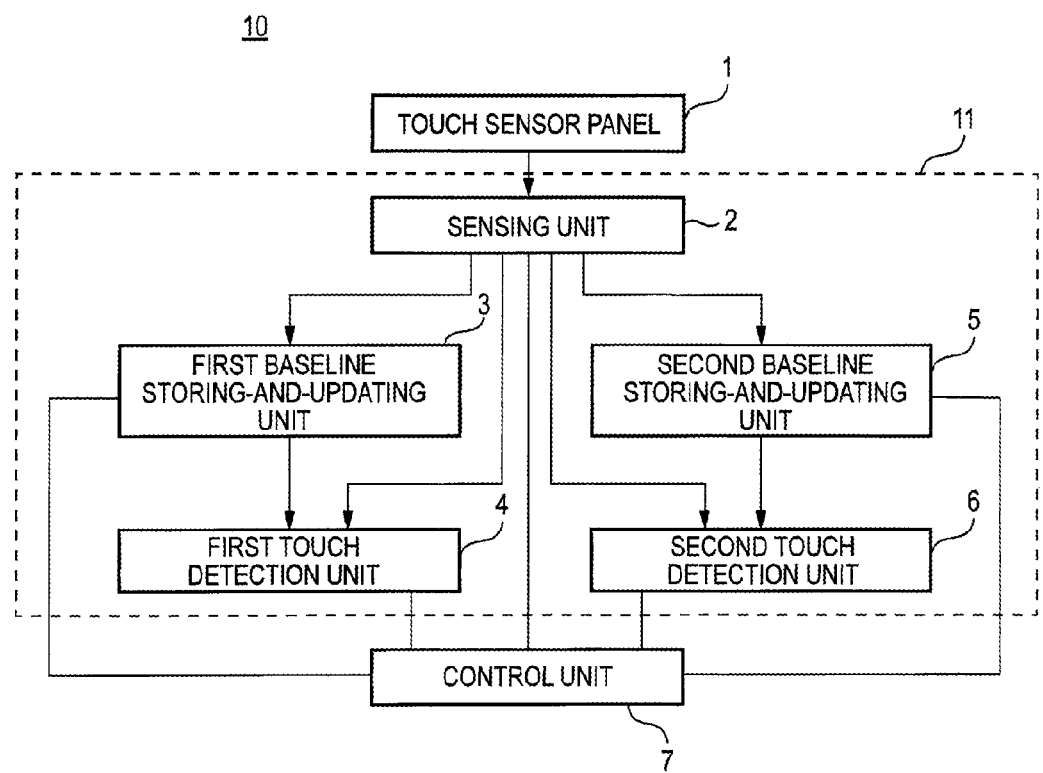
FIG. 1 is a schematic configuration diagram illustrating a touch panel device according to a first embodiment of this disclosure.

FIG. 1 is a schematic configuration diagram illustrating a touch panel device 10 according to a first embodiment of this disclosure. In FIG. 1, a reference symbol "1" represents a touch sensor panel which includes a plurality of sensors. Also, a reference symbol "11" shown by a broken wire in FIG. 1 represents a coordinate detection circuit. The coordinate detection circuit 11 includes a sensing unit 2, a first baseline storing-and-updating unit (first baseline value management unit) 3, a first touch detection unit 4, a second baseline storing-and-updating unit (second baseline value management unit) 5, and a second touch detection unit 6. The sensing unit 2 uses the sensors of the touch sensor panel 1 to perform capacitance measurement, thereby acquiring measurement values. The first baseline storing-and-updating unit 3 generates first baseline values as touch detection references, and stores and updates the first baseline values. The first touch detection unit 4 performs touch detection based on the measurement values output from the sensing unit 2 and the first baseline values stored in the first baseline storing-and-updating unit 3. The second baseline storing-and-updating unit 5 generates second baseline values and also stores and updates the second baseline values, based on the measurement values output from the sensing unit 2, according to a rule different from that of the first baseline storing-and-updating unit 3. The second touch detection unit 6 performs touch detection based on the measurement values output from the sensing unit 2 and the second baseline values stored in the second baseline storing-and-updating unit 5.

Also, a reference symbol "7" represents a control unit controls the first baseline storing-and-updating unit 3 or the second baseline storing-and-updating unit 5 to update the baseline values stored therein, and the control unit computes touch coordinate data (an X coordinate and a Y coordinate) based on the touch detection result of the first touch detection unit 4 or the second touch detection unit 6a and then outputs the touch coordinate data to a host computer (not shown).

Figure 2:
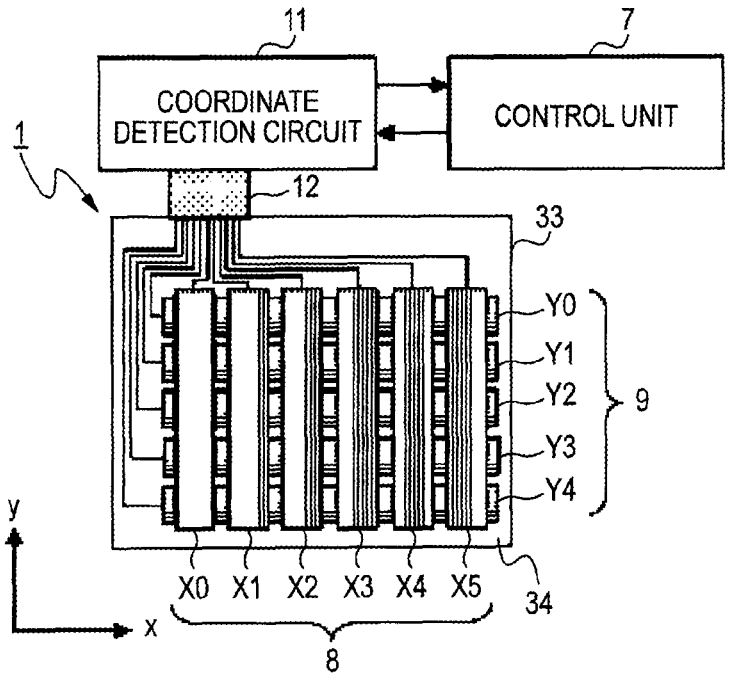
FIG. 2 is a configuration diagram illustrating the structure of a touch sensor panel.

First, as shown in FIG. 2, the touch sensor panel 1 includes a touch sensor substrate 33 and a cable 12 for exchanging signals between the coordinate detection circuit 11 and the touch sensor substrate 33.

Further, the touch sensor substrate 33 includes a plurality of detection column wires (hereinafter, referred to as X sensors) 8 which extends in a column direction (corresponding to a y direction of FIG. 2) and is arranged in parallel with a predetermined pitch in a row direction (corresponding to an x direction of FIG. 2), and a plurality of detection row wires (hereinafter, referred to as Y sensors) 9 which extends in the row direction x and is arranged in parallel with a predetermined pitch in the column direction y. Also, the X sensors 8 form one set of detection column wire groups X0 to X5 (hereinafter, referred to as an X sensor group) each of which is composed of a predetermined number of X sensors. The X sensors 8 including predetermined wires are electrically connected to a common connection wire (not shown) at an upper end and a lower end. Similarly, the Y sensors 9 form one set of detection row wire groups Y0 to Y4 (hereinafter, referred to as a Y sensor group) each of which is composed of a predetermined number of Y sensors. The Y sensors 9 including predetermined wires are electrically connected to a common connection wire (not shown) at a left and a right end.

Also, in the present embodiment, as an example, a case where the number of X sensor group is 6 (the X sensor group X0 to X5 of FIG. 2), and the number of Y sensor group is 5 (the Y sensor group Y0 to Y4 of FIG. 2) will be described.

Further, the X sensor group X0 to X5 are connected to terminals (not shown) formed on an upper end portion of the touch sensor substrate 33, by leading wires from the common connection wires positioned on the upper end, respectively. Similarly, the Y sensor group Y0 to Y4 are connected to terminals (not shown) formed on a upper end portion of the touch sensor substrate 33 positioned, by leading wires from the common connection wires positioned on the left end, respectively.

When an instructing body (such as a finger of an operator, or a stylus) touches a point of the touch sensor panel 1 of FIG. 2 including an X sensor 8 and a Y sensor 9, touch capacitance is generated between the instructing body and the X and Y sensors. Also, the number of the wires and the pitch of the wires of the X sensor group and the Y sensor group, and also the number, width, and pitch of detection wires which configures each X sensor group, and the number, width, and pitch of detection wires which constitute each Y sensor group can be appropriately selected based on resolution required for a touch coordinate (x touch coordinate data and y touch coordinate data) of the touch sensor panel 1.

Here, in a case where the material of the wires is an opaque material such as a metal, if each of the X and Y sensor group is not composed of a plurality of detection wires but is formed as one so-called solid wire, it is possible to secure high touch capacitance. However, in a case where the touch sensor substrate 33 is disposed on the front surface of an image display device or the like, the X and Y sensor group inhibit transmission of display light of the image display device or the like, and thus the transmittance of the display light decreases. For this reason, in the present embodiment, each of the X and Y sensor group is composed of a plurality of detection wires, and the area of a slit-like opening between neighboring detection wires is set to be large, whereby a decrease in the transmittance of display light is suppressed.

Meanwhile, in a case where the material of the wires is a transparent material, it is general to form each of the X and Y sensor group as one solid wire, and this configuration may be applied. In this case, each of the X sensor groups X0 to X5 and the Y sensor groups Y0 to Y4 serves one sensor, and measurement is performed in respective units of a sensor, not in s unit of a sensor group.

Subsequently, the layer configuration of the touch sensor substrate 33 will be described in brief. The top surface layer of the touch sensor substrate 33 is a transparent substrate 34, which is formed by a transparent glass material or a transparent resin. On the rear surface of the transparent substrate 34, the X sensors 8 are formed by a transparent wire material such as ITO. Then, a transparent inter-layer insulating film (not shown) is formed by silicon nitride (SiN) or the like so as to cover the X sensors 8. On the rear surface of the inter-layer insulating film, the Y sensors 9 are formed by a transparent wire material. Then, similarly to the inter-layer insulating film, a transparent protective film (not shown) is formed by SiN or the like. Alternatively, the formation positions of the X sensors 8 and the Y sensors 9 may be reversed. That is, on the rear surface of the transparent substrate, the Y sensors 9 may be formed, and on the rear surface of the inter-layer insulating film, the X sensors 8 may be formed.

Also, the detection wires may not be transparent wires using a transparent wire material such as ITO, and may be formed by a metal such as aluminum. In this case, as described above, if each detection wire group is composed of a plurality of detection wires, and the area of a slit-like opening between neighboring detection wires is set to be large, the transmittance relative to display light is secured.

The cable 12 of FIG. 2 is are mounted by flexible printed circuit (FPC) terminals with using of an anisotropic conductive film (ACF) so as to be connected to the terminals (not shown) of the touch sensor substrate 33 described above. The end portions of the detection wire groups formed on the touch sensor substrate 33 are electrically connected to the coordinate detection circuit 11 via the FPC. As a result, the touch sensor substrate 33 of FIG. 2 functions as a touch sensor panel.

The sensing unit 2 is configured by an X switch circuit connected to the X sensors 8, a Y switch circuit connected to the Y sensors 9, an oscillation circuit, and a detection control circuit (which are not shown), and the sensing unit 2 sequentially scans the sensor groups of the X sensors 8 or the Y sensors 9. That is, based on instructions of the detection control circuit, the sensing unit 2 sequentially applies an alternative signal from the oscillation circuit to the X or Y sensor group and performs capacitance measurement. Thereafter, the sensing unit 2 subtracts the first baseline values (capacitance measurement values in a state where the instructing body was far from the touch sensor panel 1 so as not to affect the touch sensor panel 1) stored in advance in the first baseline storing-and-updating unit 3, from the measurement values, thereby obtaining difference values for touch determination, and outputs the difference values to the control unit 7.

Each difference value represents a change in electrostatic capacitance between the instructing body and an X or Y sensor group. Therefore, if the instructing body is far from the touch sensor panel 1, the difference value becomes 0. Meanwhile, if the instructing body is in contact with or close to the touch sensor panel 1 (they are known collectively as "touch"), the difference value becomes large.

Based on the difference values, the first touch detection unit 4 determines whether there is a touch. If there is any X sensor difference value exceeding a predetermined touch threshold value for the X sensors and there is any Y sensor difference value exceeding a predetermined touch threshold value for the Y sensors, the first touch detection unit 4 determines that there is a touch. As described above, the first touch detection unit 4 determines that the instructing body has touched an respective sensor group corresponding to the largest one of difference values of respective sensor group exceeding the predetermined touch threshold value, and outputs the detection result representing that there is a touch and the difference values of the X and Y sensor group to the control unit 7.

Based on the touch detection result and the difference values corresponding to the X sensor group and the Y sensor group, the control unit 7 computes touch coordinate data (an X coordinate and a Y coordinate). In the present embodiment, as an example of a touch coordinate data range corresponding to a valid touch input area, a range defined by an X coordinate range of 0 to 599 and a Y coordinate range of 0 to 499 is set. Next, the control unit 7 computes touch coordinate data based on the touch detection result and the difference values corresponding to the X and Y sensor group, for example, by a known complementing method disclosed in Japanese Patent Application Laid-Open No. 2008-134836, and outputs the touch coordinate data to the host computer (not shown).

Further, in the present embodiment, in order to determine whether to regenerate the first baseline values, the second baseline storing-and-updating unit 5 and the second touch detection unit 6 shown in FIG. 1 are provided. The second touch detection unit 6 subtracts the second baseline values stored in the second baseline storing-and-updating unit 5, from the measurement values, thereby obtaining difference values for touch determination, and outputs the difference values to the control unit 7. If there is any X sensor difference value exceeding the predetermined touch threshold value for the X sensors and there is any Y sensor difference value exceeding a predetermined touch threshold value for the Y sensors, the second touch detection unit 6 determines that there is a touch. As described above, the second touch detection unit 6 determines that the instructing body has an X sensor group corresponding to the largest one of difference values of X sensor group exceeding the predetermined touch threshold value and a Y sensor group corresponding to the largest one of difference values of Y sensor group exceeding the predetermined touch threshold value, and outputs the detection result representing that there is a touch, and the difference values of the X and Y sensor group, to the control unit 7.

Figure 3:
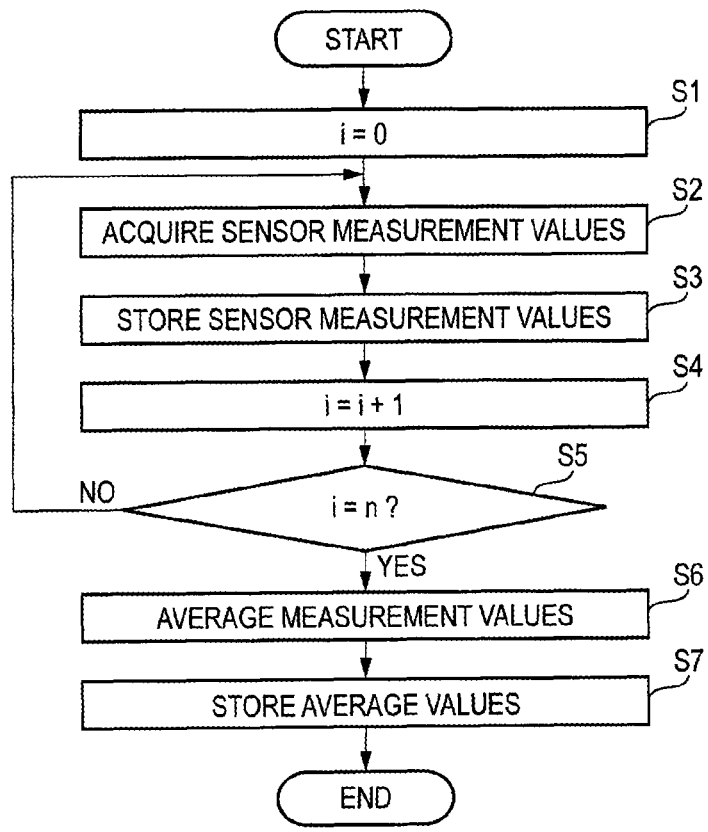
FIG. 3 is a flow chart illustrating an operation during baseline value generation according to the first embodiment of this disclosure.
Figure 4:
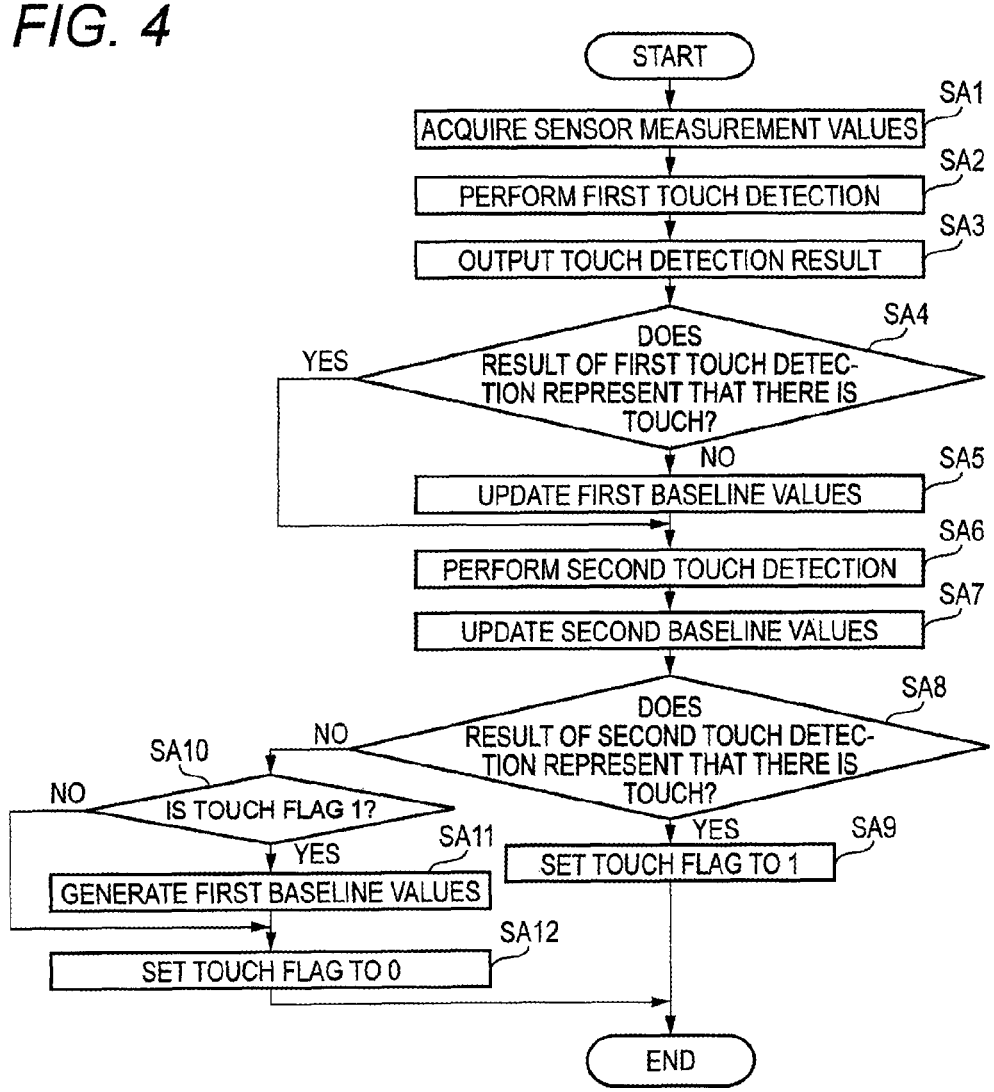
FIG. 4 is a flow chart illustrating an operation during touch detection according to the first embodiment of this disclosure.

Hereinafter, operations of the touch panel device 10 according to the first embodiment will be described with reference to graphs and flow charts. FIGS. 3 and 4 are flow charts illustrating operations of the touch panel device 10.

Figure 5:
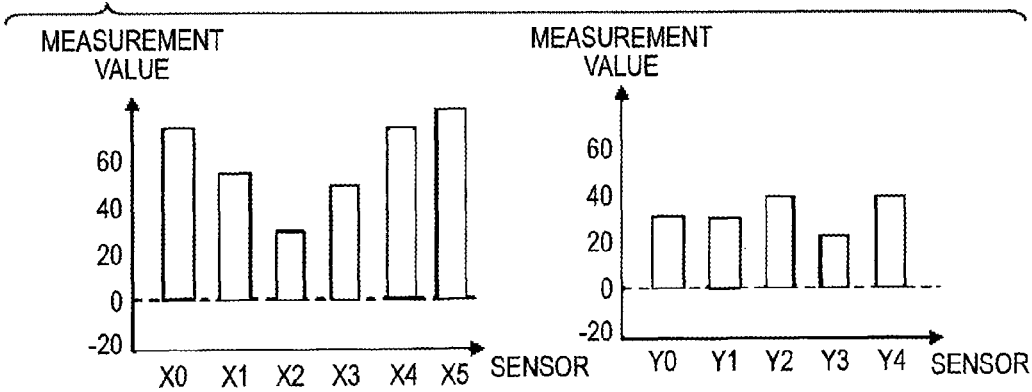
FIG. 5 is a graph illustrating examples of measurement values when there is no touch.
Figure 6:
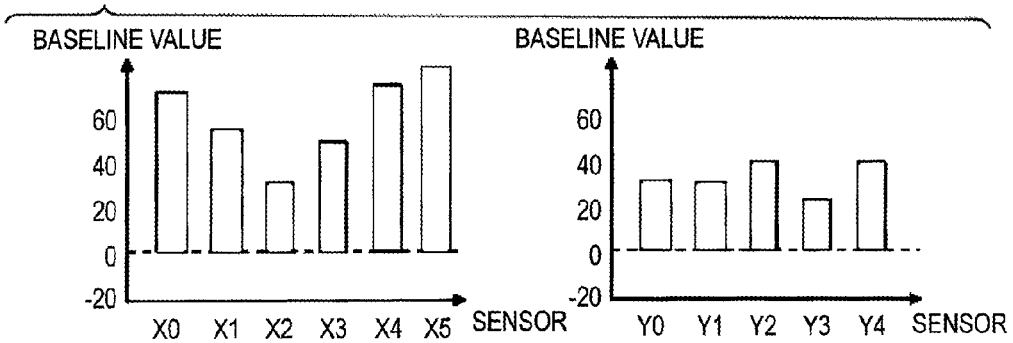
FIG. 6 is a graph illustrating examples of normal baseline values having no deviation.
Figure 7:
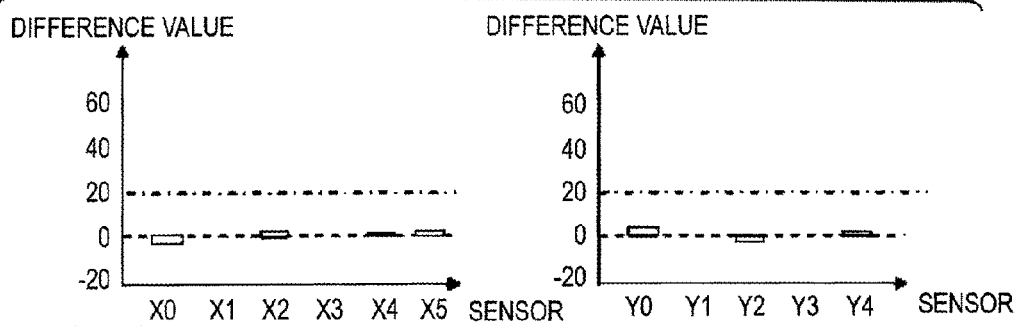
FIG. 7 is a graph illustrating examples of difference values when there is no touch and baseline values are normal.
Figure 8:
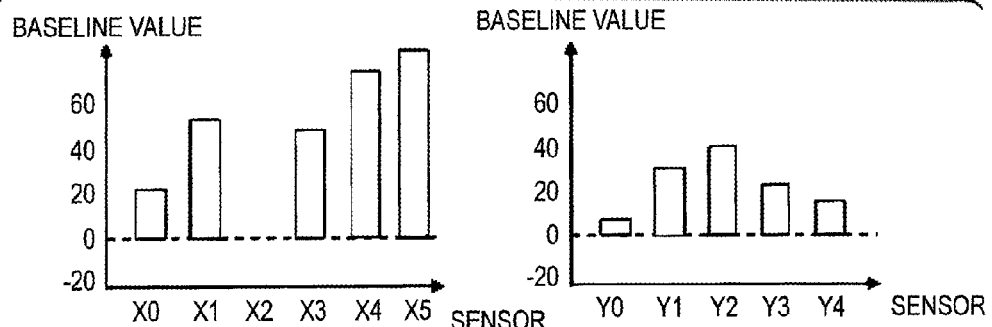
FIG. 8 is a graph illustrating examples of baseline values having deviations.
Figure 9:
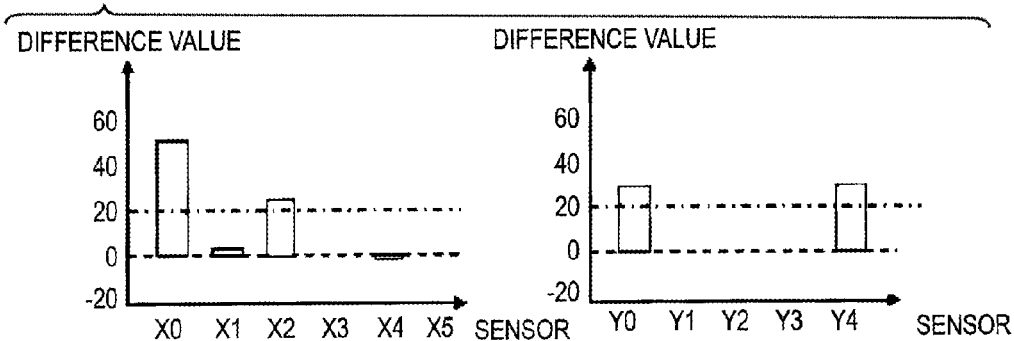
FIG. 9 is a graph illustrating examples of difference values in a case where there is no touch and baseline values have deviations.
Figure 10:
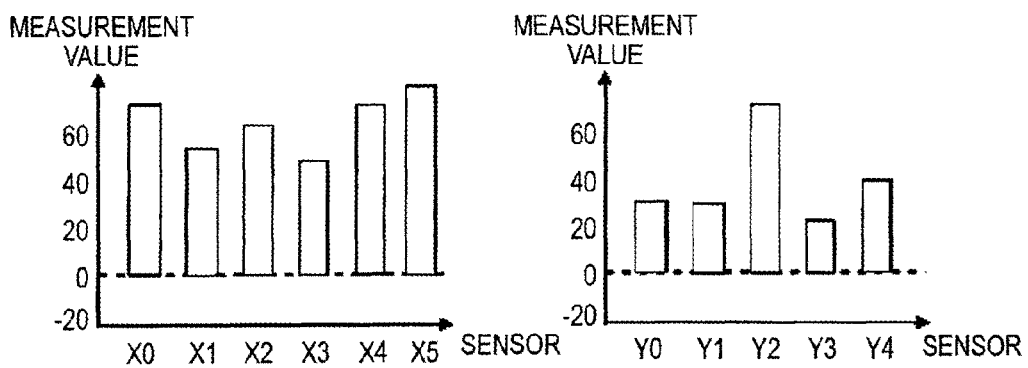
FIG. 10 is a graph illustrating examples of measurement values in a case where there is a touch.
Figure 11:
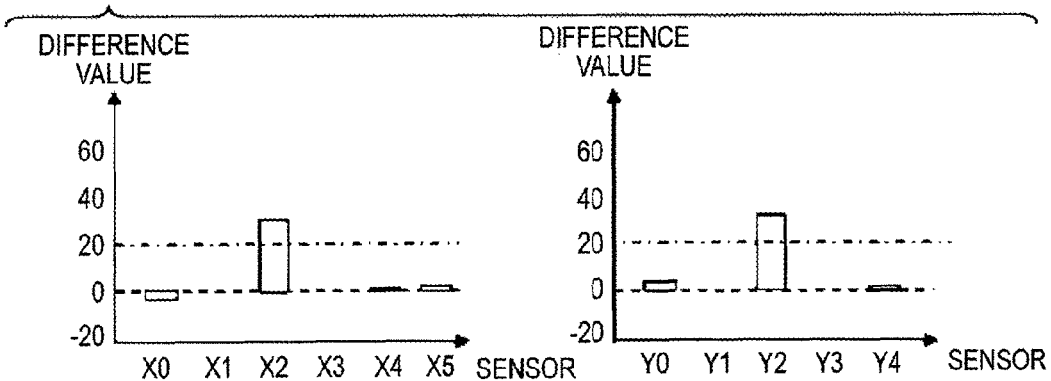
FIG. 11 is a graph illustrating difference values which are obtained from the measurement values of FIG. 10 and the baseline values of FIG. 6.
Figure 12:
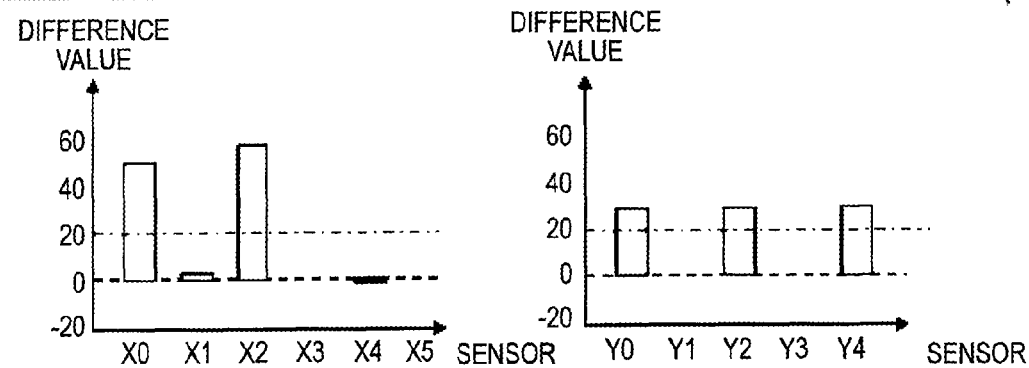
FIG. 12 is a graph illustrating difference values which are obtained from the measurement values of FIG. 10 and the baseline values of FIG. 8.

FIG. 5 is a graph illustrating examples of measurement values when the instructing body is not touched. FIG. 6 is a graph illustrating examples of normal baseline values having no deviation. FIG. 7 is a graph illustrating examples of difference values (values which are obtained by subtracting baseline values from measurement values) when the instructing body is not touched and the baseline values are normal. FIG. 8 is a graph illustrating examples of baseline values having deviations. FIG. 9 is a graph illustrating examples of difference values when the instructing body is not touched and baseline values have deviations. FIG. 10 is a graph illustrating examples of measurement values when the instructing body is touched a position (X2, Y2). FIG. 11 is a graph illustrating difference values which are obtained from the measurement values of FIG. 10 and the baseline values shown in FIG. 6 and having no deviation. FIG. 12 is a graph illustrating difference values which are obtained from the measurement values of FIG. 10 and the baseline values shown in FIG. 8 and having deviations.

Hereinafter, operations of the touch panel device 10 will be described with reference to the drawings.

First, in the first embodiment, initialization is performed immediately after the touch panel device 10 starts up, for example. In this initialization, the touch panel device 10 generates the first and second baseline values. During the generation, the touch panel device 10 acquires sensor measurement values n number of times (wherein n is a predetermined integer of 1 or greater), and sets the averages of the measurement values as baseline values. The flow chart of that operation is FIG. 3.

First, in Step S1, the control unit 7 initializes a counter I, for counting the number of times of acquisition, to 0. Next, in Step S2, the sensing unit 2 acquires sensor measurement values. In Step S2, the sensing unit 2 performs capacitance measurement on every sensor, thereby acquiring a predetermined number of measurement values. This predetermined number depends on the measuring method, and may be equal to the number of sensors, or may be less than the number of sensors by 2, or may be the product of the number of X sensor group and the number of Y sensor group. In the present embodiment, the same number of measurement values as the number of sensors is obtained (one measurement value is obtained with respect to every sensor).

Next, in Step S3, the first baseline storing-and-updating unit 3 and the second baseline storing-and-updating unit 5 stores the measurement values. Thereafter, the control unit 7 increments the counter i in Step S4 and checks whether the value of the counter i is equal to n in Step S5. If the value of the counter i is not equal to n, the control unit 7 returns to Step S2. Meanwhile, if the value of the counter i is equal to n, the control unit 7 proceeds to Step S6 in which the control unit 7 averages the n number of measurement values of each sensor. In this stage, since n number of measurement values have been acquired with respect to every sensor, the first baseline storing-and-updating unit 3 and the second baseline storing-and-updating unit 5 divides the sum of the measurement values stored with respect to each sensor by n, thereby acquiring the average value of each sensor. Thereafter, in Step S7, the first baseline storing-and-updating unit 3 and the second baseline storing-and-updating unit 5 stores the average values as baseline values.

Subsequently, an operation of detecting a touch of the instructing body will be described in detail. FIG. 4 is a flow chart of one touch detecting process, and an operation of detecting a touch of the instructing body is performed by repeating the Steps of FIG. 4 at predetermined intervals.

First, in Step SA1, the sensing unit 2 acquires sensor measurement values, similarly in Step S2 during the baseline value generation. Next, in Step SA2, the first touch detection unit 4 detects whether the instructing body is touched. In this touch detection, the first touch detection unit 4 subtracts the first baseline values stored in the first baseline storing-and-updating unit 3 from the measurement values acquired in Step SA1, thereby obtaining difference values. If there is any X sensor group 8 having a difference value exceeding the predetermined touch threshold value and there is a Y sensor group 9 having a difference value exceeding the predetermined touch threshold value, the first touch detection unit 4 determines that there is a touch, and the control unit computes a touch coordinate based on the difference values.

Then, if the control unit 7 obtains a touch coordinate, in Step SA3, the control unit 7 outputs the touch coordinate to the host computer (not shown). Meanwhile, if the control unit 7 does not obtain any touch coordinate, in Step SA3, the control unit 7 outputs information representing that there is no touch, to the host computer (not shown). In the present embodiment, if it is determined in Step SA4 that the result of the first touch detection of Step SA2 represents that any instructing body is not touched, in Step SA5, the first baseline storing-and-updating unit 3 updates the first baseline values stored therein, according to the following Expression 1. Meanwhile, if it is determined in Step SA4 that the result of the first touch detection of Step SA2 represents that an instructing body is touched, the first baseline storing-and-updating unit 3 maintains the first baseline values without performing updating.

[UPDATE BASELINE VALUE]=$W1$×[BASELINE VALUE BEFORE UPDATE]+$W2$×[SENSOR MEASUREMENT VALUE]   (Expression 1)

Here, W1 and W2 represent predetermined weight values, and the sum of W1 and W2 is set to 1.0.

For example, it is assumed that measurement values of FIG. 5 is a value in case where any instructing body is not touched. If it is assumed that the baseline values stored in the first baseline storing-and-updating unit 3 are values of FIG. 6 having small deviations, difference values calculated in Step SA2 is a value as shown in FIG. 7. For example, if the touch threshold values are set to 20 (shown by alternate long and short dash lines in FIG. 7), since any difference value does not exceed the touch threshold values, it is correctly determined that there is no touch. Also, if the first baseline values have small deviations, the first baseline values are corrected by updating of Step SA5.

Meanwhile, if it is assumed that the baseline values stored in the first baseline storing-and-updating unit 3 are values of FIG. 8 having large deviations, difference values are values as shown in FIG. 9. Any difference value of X sensor group 8 and Y sensor group 9 exceeds the touch threshold values of 20 (shown by alternate long and short dash lines in FIG. 9). As a result, it is erroneously determined that there is a touch, and updating of the first baseline values is not performed.

In a case where a touch of an instructing body is performed, and measurement values shown in FIG. 10 is acquired, difference values of FIG. 11 are obtained from the baseline values of FIG. 6 having small deviations, and thus correct touch detection is possible. However, since difference values of FIG. 12 are obtained from the baseline values of FIG. 8, and an error is made in touch detection. As described above, if the baseline values have large deviations, it is impossible to correctly perform touch detection, and it is impossible to correct the deviations (in FIGS. 11 and 12, the touch threshold values of 20 are shown by alternate long and short dash lines).

Next, in Step SA6, the second touch detection unit 6 performs touch detection. In this touch detection, the second touch detection unit 6 subtracts the second baseline values stored in the second baseline storing-and-updating unit 5 from the measurement values acquired in Step SA1, thereby obtaining difference values. If there is any X sensor group 8 having a difference value exceeding the predetermined touch threshold value and there is a Y sensor group 9 having a difference value exceeding the predetermined touch threshold value, the second touch detection unit 6 determines that there is a touch of an instructing body.

Next, in Step SA7, the second baseline storing-and-updating unit 5 updates the second baseline values stored therein. In this step, regardless of the touch detection result, the second baseline storing-and-updating unit 5 updates the baseline values according to the following Expression 2. In Step SA5 for updating the first baseline values, if the baseline values have large deviations, touch detection may be impossible, and all of the baseline values may not be updated. However, in Step SA7 for updating the second baseline values, since updating is always performed, it is guaranteed that, after any instructing body does not actually touch for a predetermined period, the baseline values become normal. If the first baseline values are normal, the touch detection of Step SA6 is also always correctly performed. Also, in a case where baseline value updating is always performed, if the degree of update (an amount of change for every updating) is set to large, changes according to touches are likely to be reflected in the baseline values. For this reason, in the present embodiment, W4 of Expression 2 is set to a value smaller than W2 of Expression 1, whereby the degree of update is reduced. For example, W2 is set to 0.25 (W1 is set to 0.75), and W4 is set to 0.05 (W3 is set to 0.95).

[UPDATE BASELINE VALUE]=$W3$×[BASELINE VALUE BEFORE UPDATE]+$W4$×[SENSOR MEASUREMENT VALUE]   (Expression 2)

Here, W3 and W4 represent predetermined weight values, and the sum of W3 and W4 is set to 1.0.

Next, in Step SA8, the control unit 7 determines whether the touch detection result of Step SA6 represents that an instructing body is touched. If it is determined that there is a touch, in Step SA9, the control unit 7 sets a touch flag to 1. Meanwhile, if it is determined that there is no touch, the control unit 7 proceeds to Step SA10 in which the control unit 7 checks the touch flag. If the touch flag 1, in Step SA11, the first baseline storing-and-updating unit 3 regenerates first baseline values to be stored therein. In the present embodiment, like during initialization, the process shown in FIG. 3 is performed, whereby the first baseline values are generated. Next, in Step SA12, the control unit 7 sets the touch flag to 0. Due to the touch flag, after the second touch detection unit 6 detects that any instructing body is touched, at a timing when it is determined for the first time that there is no touch, the baseline value generation is performed.

As described above, according to the first embodiment, regardless of any deviations of the baseline values, if the operator only touches the touch panel device with an instructing body such as a finger, it is possible to correct (generate) the baseline values for touch detection.

Also, according to the above described first embodiment, the generation method of the baseline value in the initialization is a calculation of averages of measurement values acquired n number of times. However, the baseline values may be obtained by any other calculation method, or measurement values acquired in one time may be used as a baseline value. Also, in the present embodiment, during initialization, the first baseline storing-and-updating unit 3 and the second baseline storing-and-updating unit 5 use the same procedure to generate the baseline values. However, another method may be used.

Also, in the present embodiment, the first baseline value regeneration of Step SA11 is the same as the first baseline value generation during initialization. However, another process different from the first baseline value generation during initialization may be used. Also, as described above, the timing when the first baseline value generation of Step SA11 is performed is a timing when it is determined that there is no touch for the first time after the second touch detection unit 6 detects a touch. However, the timing when the first baseline value generation of Step SA11 is performed may be any other timing such as a timing delayed for a predetermined time when there is no touch from when the second touch detection unit 6 detects a touch.

Second Embodiment

Subsequently, a second embodiment of this disclosure will be described with reference to the drawings. The schematic configuration of the second embodiment is the same as that of the first embodiment shown in FIG. 1 and is described above, and thus detailed configurations will not be described.

Figure 13:
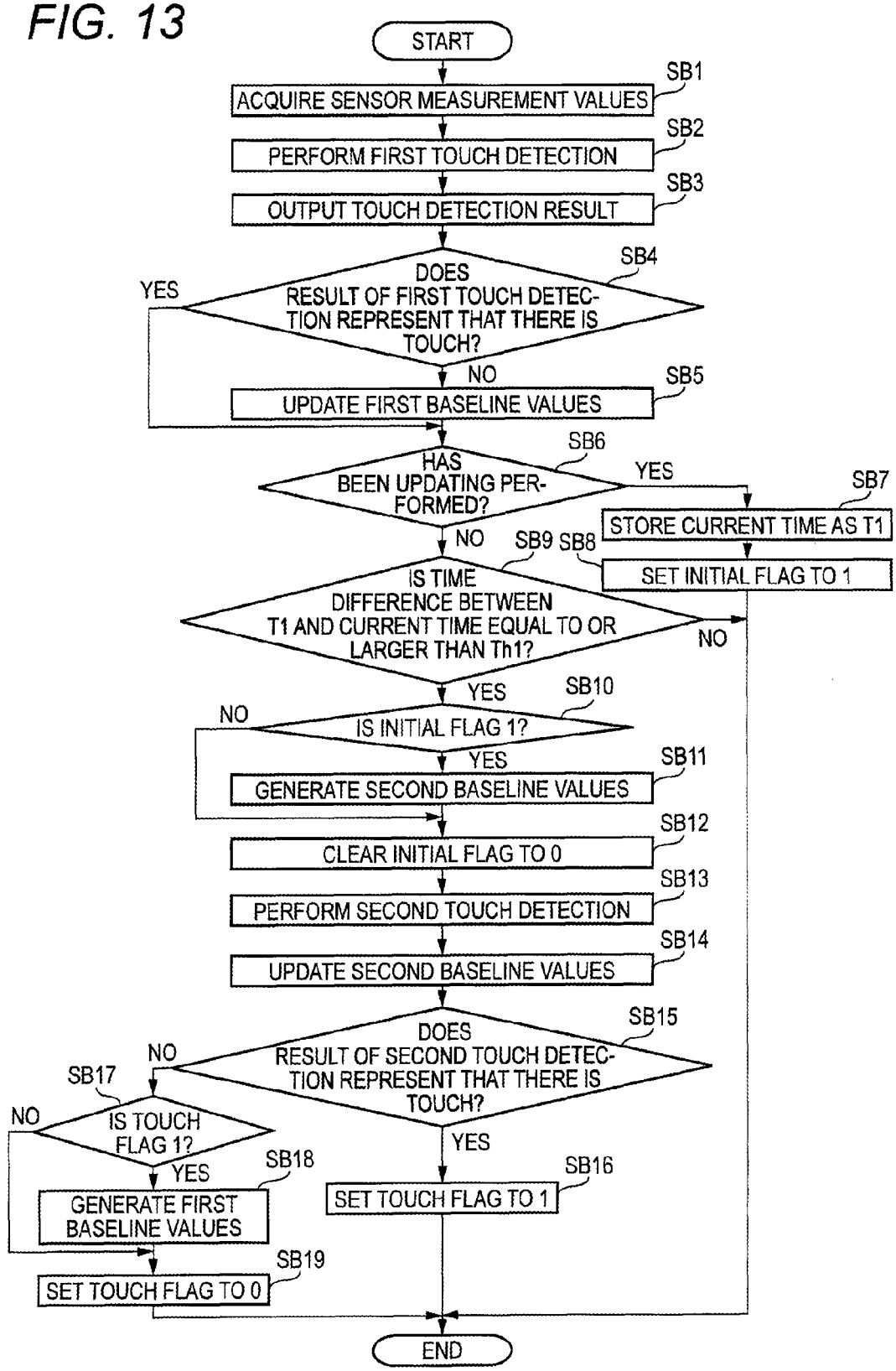
FIG. 13 is a flow chart illustrating an operation during touch detection according to a second embodiment of this disclosure.
Figure 14:
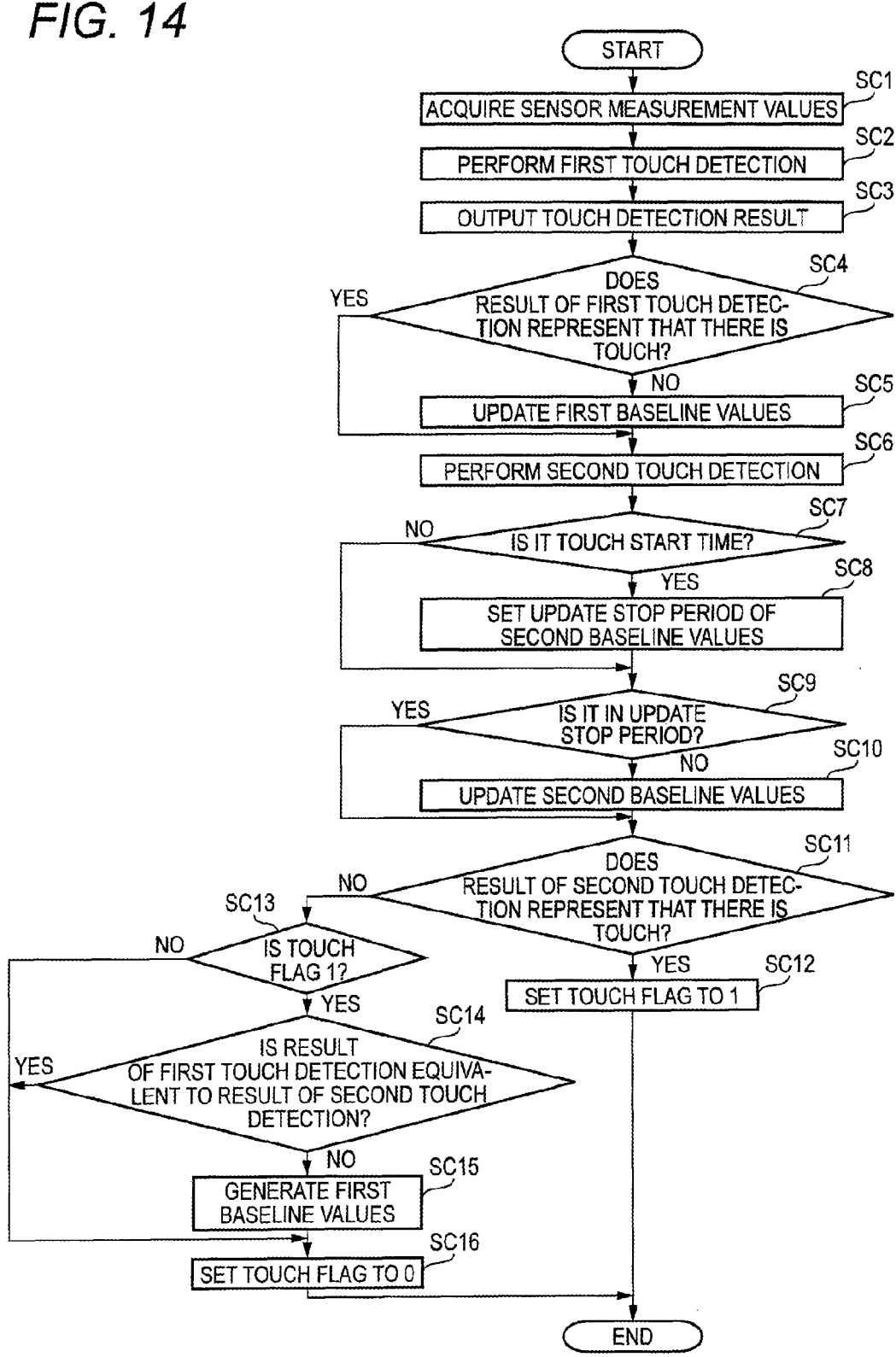
FIG. 14 is a flow chart illustrating an operation during touch detection according to a third embodiment of this disclosure.

Hereinafter, operations will be described. FIG. 13 is a flow chart illustrating an operation of a touch panel device 10 of the second embodiment. In the present embodiment, a case where the second baseline storing-and-updating unit 5 and the second touch detection unit 6 operate only when updating of the first baseline storing-and-updating unit 3 is in a stop state will be described.

Similarly to the procedure of Steps SA1 to SA5 of the above described first embodiment, first, in Step SB1, the sensing unit 2 acquires sensor measurement values. Next, in Step SB2, the first touch detection unit 4 performs touch detection. Then, in Step SB3, the control unit 7 outputs touch information to the host computer. If it is determined in Step SB2 that any instructing body is not touched, in Step SB5, updating of the first baseline values is performed according to the above Expression 1. Meanwhile, if it determined in Step SB2 that there is a touch, in Step SB4, it is determined to maintain the first baseline values without performing updating.

Next, in Step SB6, the control unit 7 determines whether updating of the first baseline values has been performed in Step SB5. If updating has been performed, the control unit 7 sets the current time as t1, in Step SB7, and sets an initial flag to 1 in Step SB8, and then finishes the process. If updating has not been performed, in Step SB9, the control unit 7 determines whether a different between t1 and the current time is a predetermined threshold value Th1 or more. If the difference between t1 and the current time is less than the predetermined threshold value Th1, the control unit 7 finishes the process. Meanwhile, if the difference between t1 and the current time is the predetermined threshold value Th1 or more, the process proceeds to Step SB10 and the subsequent steps, in which the second baseline storing-and-updating unit 5 and the second touch detection unit 6 operate. Here, the time t1 is the latest performance time of updating of Step SB5. Therefore, in Step SB9, it is checked whether the predetermined threshold value Th1 or more has elapsed from the latest performance time of updating of Step SB5.

In Step SB10, the control unit 7 checks whether the initial flag is 1. If the initial flag is 1, in Step SB11, the second baseline storing-and-updating unit 5 generates the second baseline values. In a case where Step SB10 and the subsequent steps have not been performed but are performed for the first time (a case where the second baseline storing-and-updating unit 5 and the second touch detection unit 6 stopped and then restart), the initial flag becomes 1. Therefore, in this case, it is necessary to regenerate the second baseline values (initialize the second baseline values) and activate the operations of the second touch detection unit 6 and the second baseline storing-and-updating unit 5. As a method of regenerating the second baseline values, for example, the first baseline values stored in the first baseline storing-and-updating unit 3 can be copied into the second baseline storing-and-updating unit 5, whereby second baseline value generation is performed.

Next, in Step SB12, the control unit 7 clears the initial flag to 0. Thereafter, Steps SB13 to SB19 are performed in the same procedure as that of Steps SA6 to SA12 of the above described first embodiment. Specifically, in Step SB13, the second touch detection unit 6 performs touch detection. Next, in Step SB14, the second baseline storing-and-updating unit 5 updates the second baseline values stored therein. Thereafter, in Step SB15, the control unit 7 checks whether the result of the touch detection of Step SB13 represents that there is a touch. If it is determined that there is a touch, in Step SB16, the control unit 7 sets the touch flag to 1. Meanwhile, if it is determined that there is no touch, the control unit 7 proceeds to Step SB17. In Step SB17, the control unit 7 checks the touch flag. If the touch flag is 1, in Step SB18, the first baseline storing-and-updating unit 3 regenerates first baseline values to be stored therein. Next, in Step SB19, the control unit 7 sets the touch flag to 0.

As described above, according to the second embodiment, while the first baseline storing-and-updating unit 3 performs updating, that is, while it is determined that the deviations of the baseline values of the first baseline storing-and-updating unit 3 are not large, the operations of the second baseline storing-and-updating unit 5 and the second touch detection unit 6 are stopped, whereby it is possible to suppress an increase in the process time.

Also, as described above, according to the present embodiment, the first baseline values stored in the first baseline storing-and-updating unit 3 are copied into the second baseline storing-and-updating unit 5, whereby second baseline value regeneration is performed. However, any other method is used for second baseline value regeneration.

Third Embodiment

Subsequently, a third embodiment of this disclosure will be described with reference to the drawings. The schematic configuration of the third embodiment is the same as that of the first embodiment shown in FIG. 1 and described above, and thus detailed configurations will not be described.

Hereinafter, operations will be described. FIG. 13 is a flow chart illustrating an operation of a touch panel device 10 of the third embodiment. In the present embodiment, it will be described that a case where updating of the second baseline values stored in the second baseline storing-and-updating unit 5 is stopped for a predetermined period immediately after the second touch detection unit 6 detects a touch and a case where the result of the first touch detection unit 4 is equivalent to the result of the second touch detection unit 6 first baseline value generation.

Similarly to the procedure of Steps SA1 to SA6 of the above described first embodiment, first, in Step SC1, the sensing unit 2 acquires sensor measurement values. Next, in Step SC2, the first touch detection unit 4 performs touch detection. Then, in Step SC3, the control unit 7 outputs touch information to the host computer. If it is determined in Step SC2 that any instructing body is not touched, in Step SC5, updating of the first baseline values is performed according to the above-described Expression 1. Meanwhile, if it is determined in Step SC2 that there is a touch, in Step SC4, it is determined to maintain the first baseline values without performing updating. Next, in Step SC6, the second touch detection unit performs touch detection.

In the third embodiment, in Step SC8, an update stop period of the second baseline values is set based on the touch detection result of Step SC6. For example, if it is determined in Step SC7 that it is a touch start time, in Step SC8, based on the number of X sensor group exceeding the touch threshold value and the number of Y sensor group exceeding the touch threshold value, seconds for the update stop period is determined. If both of the number of X sensor group and the number of Y sensor group are 1, the update stop period is set to 30 seconds. Meanwhile, in a case where any one of the number of X sensor group and the number of Y sensor group are 2, if the other is 2 or less, the update stop period is set to 15 seconds, and if the other is 3 or more, the update stop period is set to 0 second (an update stop period is not set).

In order to recognize the accurate timing of disappearance of a touch, it is preferable to stop baseline value updating. However, if updating is stopped without setting a time limit, returning from the stop state may become impossible. Also, in a case where there is a possibility that a touch may not be normally performed, it is efficient to set a short stop period (or if a possibility that a touch may not be normally performed is high, it is efficient to not set a stop period). Therefore, the update stop period is provided according to the touch detection result. Thereafter, the second baseline storing-and-updating unit 5 performs updating of the second baseline values stored therein. However, if it is determined in Step SC9 that it is in the update stop period, updating is not performed. If it is not in the update stop period, in Step SC10, like in Step SA7 of the above described first embodiment, updating of the second baseline values is performed.

However, in Step SC10 of the present embodiment, Expression 2 which is used in Step SA7 of the first embodiment is applied, but the values of W3 and W4 are changed. In the above described first embodiment, the second baseline values are always updated. However, in the third embodiment, since updating is stopped while touch detection is performed, it is necessary to set the degree of update to be low. Therefore, if W3 and W4 are set to the same values as those of W1 and W2 of Expression 1, or W4 is set to be larger than W2 (W3 is set to be smaller than W1), it is possible to change the second baseline values to normal states as quickly as possible. For example, W1 and W2 are set to 0.75 and 0.25, respectively, whereas W3 and W4 are set to 0.65 and 0.35, respectively.

Steps SC11 to SC13 are the same processes as Steps SA8 to SA10 of the first embodiment. In Step SC11, the control unit 7 checks whether the touch detection result of Step SC6 represents that there is a touch. If it is determined that there is a touch, in Step SC12, the control unit 7 sets the touch flag to 1. If it is determined that there is no touch, the control unit 7 proceeds to Step SC13 in which the control unit 7 checks the touch flag. If the touch flag is 1, in Step SC14, the control unit 7 checks whether the result of the first touch detection of Step SC2 is equivalent to the result of the second touch detection of Step SC6 (for example, whether differences in touch coordinates are within a predetermined range). If the result of the first touch detection of Step SC2 is not equivalent to the result of the second touch detection of Step SC6, in Step SC15, regeneration of first baseline values to be stored in the first baseline storing-and-updating unit 3 is performed. Next, the control unit 7 sets the touch flag to 0 in Step SC16, and finishes the process.

Since the result of the second touch detection is correct, in a case where it is determined in Step SC14 that the two touch detection results are equivalent, it can be said that the result of the first touch detection is correct, that is, a possibility that the baseline values of the first baseline storing-and-updating unit 3 have no deviation is high. In this case, the control unit 7 skips Step S15 for generation of the first baseline values to be stored in the first baseline storing-and-updating unit 3, and proceeds to Step SC16 in which the control unit 7 sets the touch flag to 0. If first baseline value generation is performed even though the baseline values have no deviation, too much process time is required, and there is a risk that deviations may increase. However, if the determination of Step SC14 is added, it is possible to avoid those problems.

Also, according to the third embodiment, in Step SC8, the update stop period is set according to three criteria based on the number of X sensor group exceeding the touch threshold value and the number of Y sensor group exceeding the touch threshold value. However, the update stop period may be set according to any other criteria. Also, whether the result of the first touch detection is equivalent to the result of the second touch detection is determined by determining whether differences in touch coordinates are within the predetermined range. However, any other determination criterion may be used.

What is claimed is:

1. A touch panel device including: a touch sensor panel that includes a plurality of sensors; a coordinate detection circuit that is connected to the touch sensor panel and detects touch coordinates when an instructing body touches the touch sensor panel; and a controller that controls the coordinate detection circuit, the coordinate detection circuit comprising:
   a capacitance sensor that measures the capacitance of respective sensors of the touch sensor panel,
   a first baseline value manager communicatively coupled to the capacitance sensor, which generates first baseline values as references for touch detection based on measurement values output from the capacitance sensor and stores the first baseline values and which performs updating according to a predetermined rule,
   a first touch detector communicatively coupled to the capacitance sensor, which performs touch detection based on the measurement values and the first baseline values,
   a second baseline value manager communicatively coupled to the capacitance sensor, which generates second baseline values as references for touch detection based on the measurement values and stores the second baseline values and which performs updating according to a rule different from the predetermined rule of the first baseline value manager, and
   a second touch detector communicatively coupled to the capacitance sensor, which performs touch detection based on the measurement values and the second baseline values,
   wherein the controller outputs a detection result of the first touch detector as an operation input,
   the first baseline value manager does not update the first baseline value when the touch is detected by the first touch detector,
   the second baseline value manager updates the second baseline value even when the touch is detected by the second touch detector, and
   after the second touch detector detects the touch, if the second touch detector enters a state wherein the touch is not detected by the second baseline value that is updated, the controller controls the first baseline value manager to regenerate the first baseline value.

2. The touch panel device according to claim 1, wherein, in a case where the first baseline value manager does not perform updating of the first baseline values for a predetermined period, the controller activates the second baseline value manager and the second touch detector,
   wherein, in a case where the second touch detector detects a touch, if the touch is disappeared, the controller controls the first baseline value manager to regenerate the first baseline value, and
   wherein after updating of the first baseline values restarts, the controller stops the second baseline value manager and the second touch detector.

3. The touch panel device according to claim 1, wherein, in a case where a touch detection result of the first touch detector is different from a touch detection result of the second touch detector, the controller controls the first baseline value manager to regenerate the first baseline value.

4. The touch panel device according to claim 1, wherein, according to a detection result of the second touch detector, the controller controls the second baseline value manager to update the second baseline value.

5. The touch panel device according to claim 1, wherein the controller does not output a detection result of the second touch detector as the operation output.

* * * * *